United States Patent
Hogg (10) Patent No.: US 9,047,917 B1
(45) Date of Patent: Jun. 2, 2015

(54) DISK DRIVE SLIDER WITH SENSE AMPLIFIER FOR COUPLING TO A PREAMP THROUGH A SUPPLY/BIAS LINE AND A READ SIGNAL LINE

(71) Applicant: Western Digital Technologies, Inc., Irvine, CA (US)

(72) Inventor: Dennis W. Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/090,873

(22) Filed: Nov. 26, 2013

(51) Int. Cl.
| | |
|---|---|
| G11B 5/09 | (2006.01) |
| G11B 20/10 | (2006.01) |
| G11B 5/012 | (2006.01) |
| G11B 5/02 | (2006.01) |

(52) U.S. Cl.
CPC .......... *G11B 20/10027* (2013.01); *G11B 5/012* (2013.01); *G11B 5/02* (2013.01)

(58) Field of Classification Search
CPC .. G11B 2005/0016; G11B 5/012; G11B 5/02; G11B 5/59605; G11B 5/5526; G11B 5/09; G11B 5/54; H03F 3/45089
USPC .................. 360/46, 67, 39, 55, 75, 69, 78.04; 318/650, 560, 561, 568.22; 330/254
See application file for complete search history.

(56) References Cited

U.S. PATENT DOCUMENTS

| | | | |
|---|---|---|---|
| 5,065,094 A | 11/1991 | Mowry | |
| 5,548,453 A | 8/1996 | Sasaki et al. | |
| 5,712,747 A | 1/1998 | Voldman et al. | |
| 5,771,571 A | 6/1998 | Voldman et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |

(Continued)

FOREIGN PATENT DOCUMENTS

EP 0595350 B1 4/1999

OTHER PUBLICATIONS

Peter Elenius, Lee Levine,"Comparing Flip-Chip and Wire-Bond Interconnection Technologies", Chip Scale Review, Jul./Aug. 2000, ChipScaleReview.com.

(Continued)

*Primary Examiner* — Ali Neyzari (57) ABSTRACT

A disk drive slider is disclosed comprising a first read element for generating a first read signal, and a first sense amplifier comprising a first input terminal coupled to the first read element, a first output terminal coupled to a first output line, and a first supply terminal coupled to a supply line. The first sense amplifier is for amplifying the first read signal to generate a first amplified read signal, the first output line is for transmitting the first amplified read signal to a preamp, and the supply line is for coupling to the preamp in order to supply power to the first sense amplifier and supply a first bias to the first read element.

11 Claims, 3 Drawing Sheets

(56) References Cited

U.S. PATENT DOCUMENTS

| | | |
|---|---|---|
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,351,353 B1 | 2/2002 | Sluzewski et al. |
| 6,369,969 B1 | 4/2002 | Christiansen et al. |
| 6,377,411 B1 | 4/2002 | Katsumata et al. |
| 6,384,999 B1 | 5/2002 | Schibilla |
| 6,388,833 B1 | 5/2002 | Golowka et al. |
| 6,400,529 B1 | 6/2002 | Baba et al. |
| 6,404,575 B1 | 6/2002 | Yen |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,577,476 B1 | 6/2003 | Childress et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,707,625 B2 * | 3/2004 | Leighton et al. ............... 360/46 |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,762,896 B2 | 7/2004 | Yoshizawa et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |

(56) References Cited

U.S. PATENT DOCUMENTS

| | | |
|---|---|---|
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,050,268 B2 | 5/2006 | Kikuchi et al. |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,004 B2 * | 7/2006 | Kajiyama et al. ............... 360/46 |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,119,995 B2 | 10/2006 | Granstrom et al. |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,230,805 B2 | 6/2007 | Childress et al. |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,289,302 B1 | 10/2007 | Mallary |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,522,368 B2 * | 4/2009 | Xia et al. ............... 360/67 |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,330 B2 * | 1/2010 | Yamashita et al. ............ 318/560 |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |

(56) References Cited

U.S. PATENT DOCUMENTS

| | | |
|---|---|---|
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2004/0245985 A1 | 12/2004 | Mayfield et al. |
| 2006/0132125 A1 | 6/2006 | Withanawasam |
| 2008/0180854 A1 | 7/2008 | Chang et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |

(56) References Cited

U.S. PATENT DOCUMENTS

2012/0324980 A1    12/2012   Nguyen et al.
2013/0033783 A1    2/2013    Gerasimov

OTHER PUBLICATIONS

Akinobu S., Akira O., Koichi T., "A Silicon Interposer With an Integrated SrTiO3 Thin Film Decoupling Capacitor and Through-Silicon Vias", IEEE Transactions on Components and Packaging Technologies, vol. 33, No. 3, Sep. 2010.

Michael L. Mallary, et al. U.S. Appl. No. 13/890,131, filed May 8, 2014, 18 pages.

Final Office Action dated Sep. 25, 2014 from U.S. Appl. No. 13/890,131, 8 pages.

Office Action dated Apr. 11, 2014 from U.S. Appl. No. 13/890,131, 10 pages.

* cited by examiner

DISK DRIVE SLIDER WITH SENSE AMPLIFIER FOR COUPLING TO A PREAMP THROUGH A SUPPLY/BIAS LINE AND A READ SIGNAL LINE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

A number of heads are typically fabricated on a substrate of a wafer (e.g., an aluminum titanium carbide (ALTiC) wafer) which is then sliced to form sliders. Each slider is coupled to one of the actuator arms through a suspension that biases the slider toward the disk surface. The slider comprises an air-bearing surface (ABS) wherein as the disk rotates, an air-bearing is formed between the slider and the disk that counteracts the bias force of the suspension. Accordingly, the head essentially flies just above the disk surface during write/read operations. Data is typically written to the disk by modulating a write current in an inductive coil of the head to record magnetic transitions onto the disk surface in a process referred to as saturation recording. During readback, the magnetic transitions are sensed by a read element (e.g., a magnetoresistive element) of the head and the resulting read signal demodulated by a suitable read channel.

DETAILED DESCRIPTION

Figure 1A:
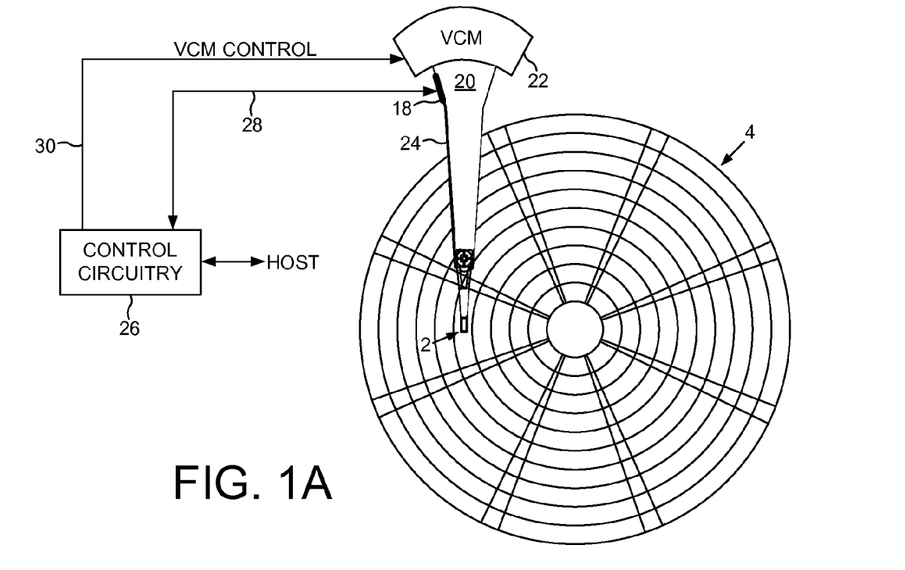
FIG. 1A shows a disk drive according to an embodiment comprising a head fabricated on a slider that is actuated over a disk.

FIG. 1A shows a disk drive comprising a head 2 actuated over a disk 4 according to an embodiment, wherein the head 2 is fabricated on a disk drive slider 6 (FIG. 1C) comprising a first read element $8_1$ for generating a first read signal $10_1$, and a first sense amplifier $12_1$. The first sense amplifier $12_1$ comprises a first input terminal coupled to the first read element $8_1$, a first output terminal coupled to a first output line $14_1$, and a first supply terminal coupled to a supply line 16. The first sense amplifier $12_1$ is for amplifying the first read signal $10_1$ to generate a first amplified read signal, the first output line $14_1$ is for transmitting the first amplified read signal to a preamp 18, and the supply line 16 is for coupling to the preamp 18 in order to supply power to the first sense amplifier $12_1$ and supply a first bias to the first read element $8_1$.

Figure 1B:
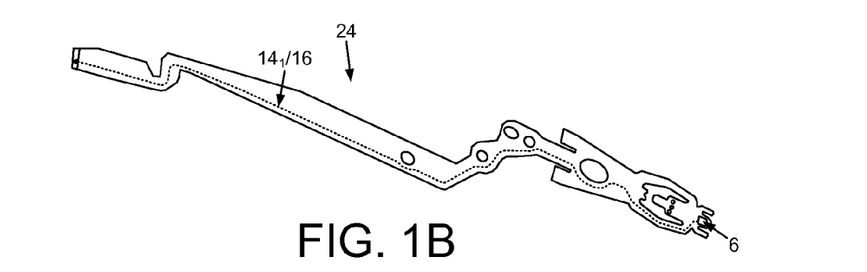
FIG. 1B shows an interconnect for connecting the first read element to a preamp through a first sense amplifier of the slider according to an embodiment.
Figure 1C:
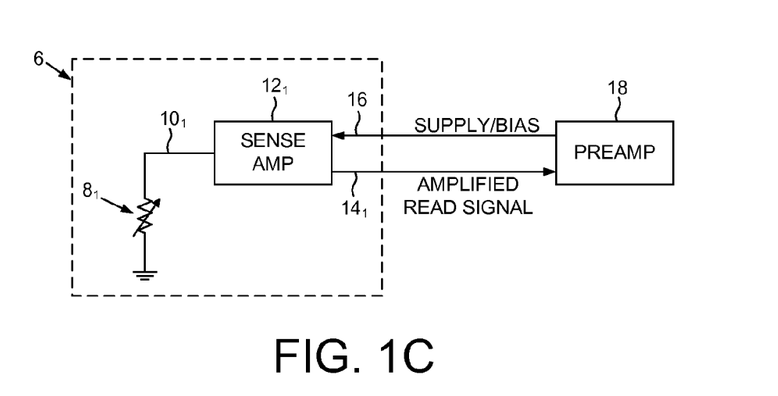
FIG. 1C shows an embodiment wherein the first sense amplifier comprises a first input terminal coupled to the first read element, a first output terminal coupled to a first output line, and a first supply terminal coupled to a first input line.

In the embodiment of FIG. 1A, the preamp 18 is mounted on the side of an actuator arm 20 that is rotated about a pivot by a voice coil motor (VCM) 22. In one embodiment, the preamp 18 is coupled to the slider 6 through a suitable interconnect 24 an example of which is shown in FIG. 1B. In one embodiment, the interconnect 24 comprises a suitable flex circuit comprising any suitable number of transmission lines, including the first output line $14_1$ and the supply line 16. In one embodiment, the first sense amplifier $12_1$ of FIG. 1C provides an initial amplification of the first read signal $10_1$ so as to reduce the effective distortions of the interconnect 24. That is, the first sense amplifier $12_1$ may allow a gain of the preamp 18 to be reduced so as to reduce the noise amplification of the preamp 18. In addition, the first sense amplifier $12_1$ may be fabricated so that it's output impedance better matches the impedance of the interconnect 24 transmission line and the preamp 18 as compared to the impedance of the first read element $8_1$.

FIG. 1C illustrates another embodiment as comprising a disk drive preamp 18 comprising a supply line 16 for coupling to a first supply terminal of a first sense amplifier $12_1$ of a slider 6, and a first input line $14_1$ for coupling to a first output terminal of the first sense amplifier $12_1$. The first sense amplifier $12_1$ is for amplifying a first read signal generated by a first read element $8_1$ of the slider 6 to generate a first amplified read signal. The first input line $14_1$ is for receiving the first amplified read signal, and the supply line 16 is for supplying power to the first sense amplifier $12_1$ and for supplying a first bias to the first read element $8_1$.

The preamp 18 receives the amplified read signal from the first sense amplifier $12_1$ over line $14_1$ and further amplifies the read signal to generate an amplified read signal transmitted to control circuitry 26 over line 28 (FIG. 1A). The control circuitry 26 may process the amplified read signal in order to demodulate user data recorded on the disk 4 as well as servo data, such as servo data recorded in concentric servo sectors. The control circuitry 26 processes the servo data in order to generate an actuator control signal, such as a VCM control signal 30 applied to the VCM 22, in order to actuate the head 2 over the disk 4.

Figure 2:
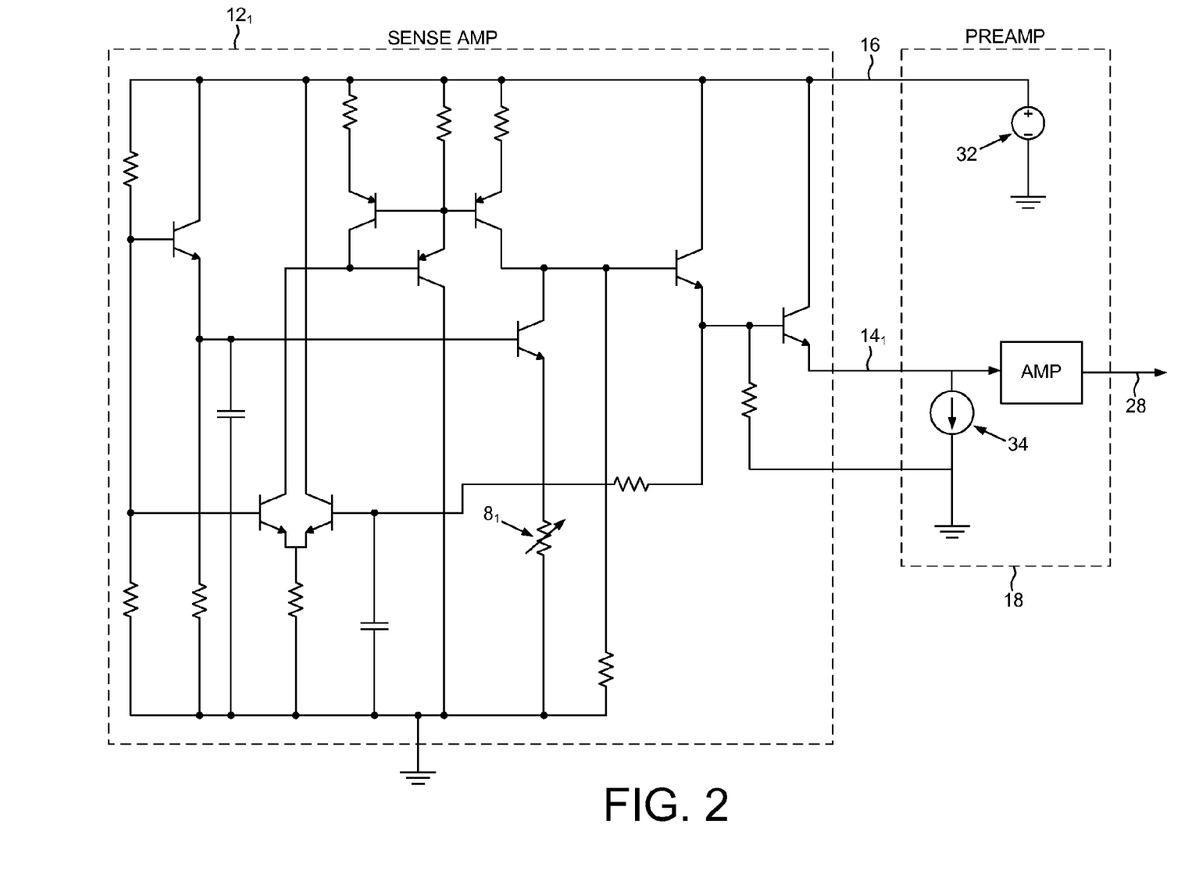
FIG. 2 shows an embodiment of the first sense amplifier for amplifying a first read signal generated by the first read element.

FIG. 2 shows an embodiment of the first sense amplifier $12_1$ as an integrated circuit that may be fabricated with the slider 6 or fabricated separate from the slider 6 and then adhered to the slider 6. FIG. 2 shows a particular circuit configuration for implementing an amplifier; however, other embodiments may employ any suitable amplifier circuit configuration. In addition, the circuit components shown in FIG. 2 (resistors, transistors, capacitors, etc.) may take on any suitable values, and in one embodiment, the values may depend on the amplitude of the supply voltage applied to the first sense amplifier $12_1$ over the supply line 16 as well as the desired amplitude range of the amplified read signal applied to the first output line $14_1$.

In the embodiment of FIG. 2, the first sense amplifier $12_1$ generates the first amplified read signal as a single ended signal as compared to a differential signal. That is, the first amplified read signal is generated relative to ground using a single polarity supply voltage. In an embodiment described below, generating the amplified read signal as a single ended signal enables a multiple read element head wherein the read signal generated by each read element is transmitted over a single transmission line to the preamp 18.

In the embodiment of FIG. 2, the preamp 18 comprises a suitable voltage source 32 for generating a supply voltage applied to the supply line 16. The supply voltage provides power to the first sense amplifier $12_1$ as well biases the first read element $8_1$. The preamp 18 in the embodiment of FIG. 2 also comprises a first current source 34 coupled to the first output line $14_1$ of the first sense amplifier $12_1$. In one embodiment, the first current source 34 is configured in order to control an output impedance of the first sense amplifier $12_1$. For example, the first current source 34 may be configured to better match the output impedance of the first sense amplifier $12_1$ to the transmission line as well as to the input impedance of the preamp 18.

Figure 3:
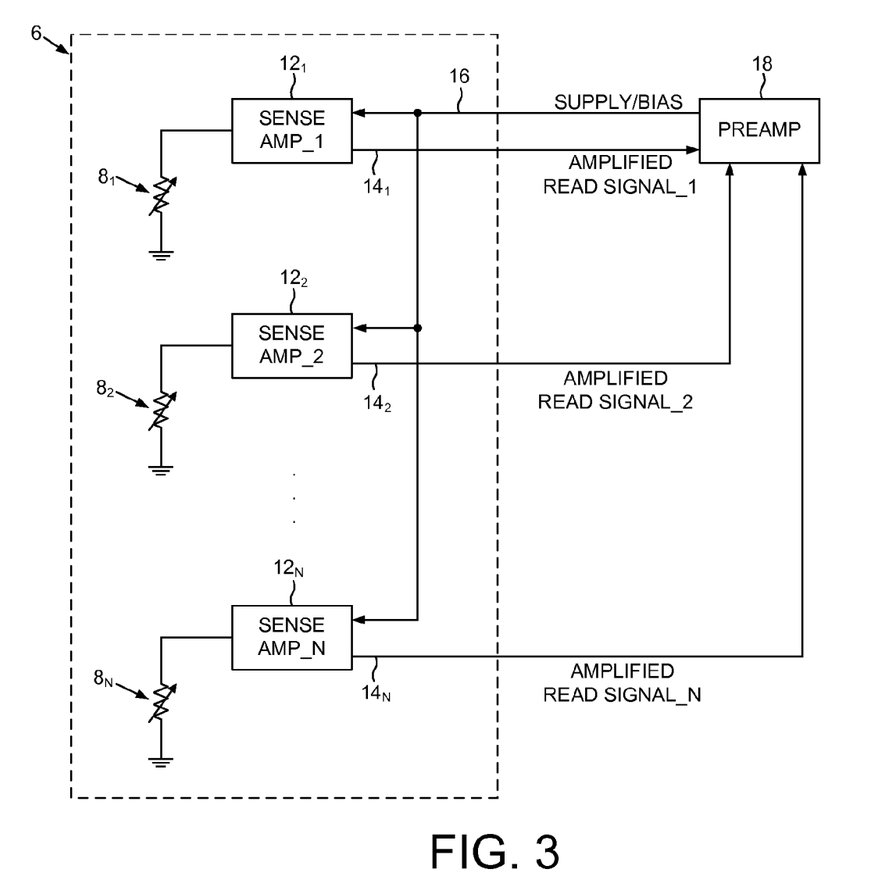
FIG. 3 shows an embodiment wherein the slider comprises multiple read elements and a separate sense amplifier for amplifying each read signal generated by each read element.

FIG. 3 shows an embodiment wherein the slider 6 comprises multiple read elements $8_1$-$8_N$, including a second read element $8_2$ for generating a second read signal, and a second sense amplifier $12_2$ comprising a second input terminal coupled to the second read element $8_2$, a second output terminal coupled to a second output line $14_2$, and a second supply terminal coupled to the supply line 16. The second sense amplifier $12_2$ is for amplifying the second read signal to generate a second amplified read signal. The second output line $14_2$ is for transmitting the second amplified read signal to the preamp 18. The supply line 16 is for coupling to the preamp 18 in order to supply power to the second sense amplifier $12_2$ and supply a second bias to the second read element $8_2$.

The embodiment of FIG. 3 reduces the number of transmission lines in the flex circuit of the interconnect 24 (FIG. 1B) by using the supply line 16 to supply power and bias all of the read elements $8_1$-$8_N$ of the slider 6. When the amplified read signals are generated as single ended signals such as shown in the embodiment of FIG. 2, the flex circuit of the interconnect 24 may comprise as few as N+1 transmission lines as compared to 4N transmission lines if each read element $8_1$-$8_N$ were powered and biased using separate lines, and if each amplified read signal were generated as a differential signal.

Any suitable read element may be employed in the embodiments, such as a magnetoresistive (MR) read element having a resistance that varies relative to the magnetic field emanating from the surface of the disk. In one embodiment, the read element is biased (e.g., using a voltage or current applied over the supply line 16) so as to optimize the sensitivity of the read element. In an embodiment where the head 2 comprises multiple read elements $8_1$-$8_N$ such as shown in the embodiment of FIG. 3, the control circuitry 26 (FIG. 1A) may execute a calibration procedure to determine an optimal bias setting for each read element. The control circuitry 26 may then configure the preamp 18 to bias the read elements $8_1$-$8_N$ based on the optimal bias setting calibrated for each read element $8_1$-$8_N$. For example, the control circuitry 26 may configure the preamp 18 to apply an operating bias to at least two of the read elements $8_1$-$8_N$ over the supply line 16, wherein the operating bias may be generated as the average (or other suitable statistic) of the optimal bias settings calibrated for each read element. In this manner, at least two of the read elements may operate in parallel, for example, to simultaneously read multiple data tracks, or to read a single data track using multiple read elements to improve the signal-to-noise ratio (SNR) by combining the resulting read signals.

In one embodiment the control circuitry 26 of FIG. 1A may comprise a suitable microprocessor executing instructions, the instructions being operable to cause the microprocessor to perform the embodiments described herein, such as executing the calibration procedure to configure the bias setting for the read elements as well as configure the preamp 18 during normal access operations. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry 26 comprises suitable logic circuitry, such as state machine circuitry.

What is claimed is:

1. A disk drive slider comprising:
   a first read element for generating a first read signal; and
   a first sense amplifier comprising a first input terminal coupled to the first read element, a first output terminal coupled to a first output line, and a first supply terminal coupled to a supply line, wherein:
      the first sense amplifier is for amplifying the first read signal to generate a first amplified read signal;
      the first output line is for transmitting the first amplified read signal to a preamp; and
      the supply line is for coupling to the preamp in order to supply power to the first sense amplifier and supply a first bias to the first read element.

2. The disk drive slider as recited in claim 1, further comprising:
   a second read element for generating a second read signal; and
   a second sense amplifier comprising a second input terminal coupled to the second read element, a second output terminal coupled to a second output line, and a second supply terminal coupled to the supply line, wherein:
      the second sense amplifier is for amplifying the second read signal to generate a second amplified read signal;
      the second output line is for transmitting the second amplified read signal to the preamp; and
      the supply line is for coupling to the preamp in order to supply power to the second sense amplifier and supply a second bias to the second read element.

3. The disk drive slider as recited in claim 1, wherein the first sense amplifier is for generating the first amplified read signal as a single ended signal.

4. A disk drive preamp comprising:
   a supply line for coupling to a first supply terminal of a first sense amplifier of a slider; and
   a first input line for coupling to a first output terminal of the first sense amplifier, wherein:
      the first sense amplifier is for amplifying a first read signal generated by a first read element of the slider to generate a first amplified read signal;
      the first input line is for receiving the first amplified read signal; and
      the supply line is for supplying power to the first sense amplifier and for supplying a first bias to the first read element.

5. The disk drive preamp as recited in claim 4, further comprising a second input line for coupling to a second output terminal of a second sense amplifier, wherein:
   the second sense amplifier is for amplifying a second read signal generated by a second read element of the slider to generate a second amplified read signal;
   the second input line is for receiving the second amplified read signal; and
   the supply line is for supplying power to the second sense amplifier and for supplying a second bias to the second read element.

6. The disk drive preamp as recited in claim 4, wherein the first input line is for receiving the first amplified read signal as a single ended signal.

7. The disk drive preamp as recited in claim 4, further comprising a first current source coupled to the first input line for controlling an output impedance of the first sense amplifier.

8. The disk drive preamp as recited in claim 5, further comprising:
- a first current source coupled to the first input line for controlling a first output impedance of the first sense amplifier; and
- a second current source coupled to the second input line for controlling a second output impedance of the second sense amplifier.

9. A method of operating a disk drive preamp, the disk drive preamp comprising:
- a supply line for coupling to a first supply terminal of a first sense amplifier of a slider; and
- a first input line for coupling to a first output terminal of the first sense amplifier, wherein:
  - the first sense amplifier is for amplifying a first read signal generated by a first read element of the slider to generate a first amplified read signal;
  - the first input line is for receiving the first amplified read signal; and
  - the supply line is for supplying power to the first sense amplifier and for supplying a first bias to the first read element,
- wherein the method comprises adjusting a current source coupled to the first input line to adjust an output impedance of the first sense amplifier.

10. A disk drive comprising:
- a disk;
- a slider actuated over the disk, the slider comprising a first read element, a first sense amplifier, a second read element, and a second sense amplifier;
- a preamp comprising:
  - a supply line for coupling to a first supply terminal of the first sense amplifier and for coupling to a second supply terminal of the second sense amplifier; and
  - a first input line for coupling to a first output terminal of the first sense amplifier, and a second input line for coupling to a second output terminal of the second sense amplifier,
  - wherein:
    - the first sense amplifier is for amplifying a first read signal generated by the first read element to generate a first amplified read signal;
    - the first input line is for receiving the first amplified read signal;
    - the second sense amplifier is for amplifying a second read signal generated by the second read element to generate a second amplified read signal;
    - the second input line is for receiving the second amplified read signal; and
    - the supply line is for supplying power to the first and second sense amplifier and for supplying an operating bias to the first and second read element, and
- control circuitry configured to:
- calibrate a first bias supplied to the first read element;
- calibrate a second bias supplied to the second read element; and
- generate the operating bias based on the first bias and the second bias.

11. A method of operating a disk drive, the disk drive comprising a preamp comprising:
- a supply line for coupling to a first supply terminal of a first sense amplifier of a slider and for coupling to a second supply terminal of a second sense amplifier of the slider; and
- a first input line for coupling to a first output terminal of the first sense amplifier, and a second input line for coupling to a second output terminal of the second sense amplifier,
- wherein:
  - the first sense amplifier is for amplifying a first read signal generated by a first read element of the slider to generate a first amplified read signal;
  - the first input line is for receiving the first amplified read signal;
  - the second sense amplifier is for amplifying a second read signal generated by a second read element of the slider to generate a second amplified read signal;
  - the second input line is for receiving the second amplified read signal; and
  - the supply line is for supplying power to the first and second sense amplifier and for supplying an operating bias to the first and second read element,
- wherein the method comprises:
  - calibrating a first bias supplied to the first read element;
  - calibrating a second bias supplied to the second read element; and
  - generating the operating bias based on the first bias and the second bias.

* * * * *